(12) United States Patent
Krawinkel et al.

(10) Patent No.: US 8,721,832 B2
(45) Date of Patent: May 13, 2014

(54) PRESSURE-SENSITIVE ADHESIVE AND DETACHABLE STRIP FORMED FROM IT

(75) Inventors: Thorsten Krawinkel, Hamburg (DE); Bodo zu Putlitz, Hamburg (DE)

(73) Assignee: tesa SE, Hamburg (DE)

( * ) Notice: Subject to any disclaimer, the term of this patent is extended or adjusted under 35 U.S.C. 154(b) by 0 days.

(21) Appl. No.: 13/353,590

(22) Filed: Jan. 19, 2012

(65) Prior Publication Data

US 2012/0111494 A1  May 10, 2012

Related U.S. Application Data

(62) Division of application No. 12/113,983, filed on May 2, 2008, now Pat. No. 8,128,781.

(30) Foreign Application Priority Data

May 4, 2007 (DE) .......................... 10 2007 021 504

(51) Int. Cl.
*C04B 37/00* (2006.01)
*B41J 2/16* (2006.01)
*B32B 7/12* (2006.01)
*C08L 45/00* (2006.01)
*C08L 25/02* (2006.01)

(52) U.S. Cl.
USPC ........... 156/325; 156/326; 156/327; 525/216; 525/241

(58) Field of Classification Search
USPC ............................ 156/325–327; 525/216, 241
See application file for complete search history.

(56) References Cited

U.S. PATENT DOCUMENTS

| 4,024,312 A | 5/1977 | Korpman |
| 4,833,193 A | 5/1989 | Sieverding |
| 2004/0092663 A1 | 5/2004 | Krawinkel |
| 2004/0241372 A1 | 12/2004 | Krawinkel |

FOREIGN PATENT DOCUMENTS

| DE | 33 31 016 C2 | 10/1984 |
| DE | 42 22 849 A1 | 6/1993 |
| DE | 195 31 696 A1 | 3/1997 |
| DE | 196 49 727 A1 | 6/1998 |
| DE | 196 49 728 A1 | 6/1998 |
| DE | 196 49 729 A1 | 6/1998 |
| DE | 197 08 364 A1 | 9/1998 |
| DE | 197 20 145 A1 | 11/1998 |
| DE | 198 20 858 A1 | 11/1999 |
| DE | 100 03 318 A1 | 8/2001 |
| DE | 101 41 378 A1 | 4/2003 |
| EP | 1 347 028 A | 9/2003 |
| JP | 2002 220572 A | 8/2002 |
| WO | 92 11332 A1 | 7/1992 |
| WO | 95 06691 A1 | 3/1995 |
| WO | 99 37729 A1 | 7/1999 |

*Primary Examiner* — Michael Orlando
(74) *Attorney, Agent, or Firm* — Norris McLaughlin & Marcus, P.A.

(57) ABSTRACT

Disclosed is a pressure-sensitive adhesive for single- or double-sidedly tacky pressure-sensitive adhesive strips that are redetachable without residue or destruction both by extensive stretching substantially in the bond plane and by peeling. The pressure-sensitive adhesive is composed at least of (1) a vinylaromatic block copolymer, (2) a solid tackifying resin having a softening temperature by the ring-and-ball method of more than 30° C. and (3) a resin which is liquid at room temperature (23° C.), wherein the fraction of liquid resin accounts for at least 40% by weight, based on the total amount of resin. Also disclosed are strips formed from the adhesive and the use of the strips to form redetachable bonds.

7 Claims, 2 Drawing Sheets

PRESSURE-SENSITIVE ADHESIVE AND DETACHABLE STRIP FORMED FROM IT

This application is a division of U.S. application Ser. No. 12/113,983, filed May 2, 2008, now U.S. Pat. No. 8,128,781, which claims foreign priority benefit under 35 U.S.C. §119 of Germany Application No. 10 2007 021 504.7 filed May 4, 2007, the disclosures of which are incorporated herein by reference.

The invention relates to a pressure-sensitive adhesive based on vinylaromatic block copolymers and to a detachable pressure-sensitive adhesive strip which is formed from it and can be redetached both by peeling and by extensive stretching substantially in the direction of the bond plane.

Highly elastically or plastically extensible self-adhesive tapes which are redetachable without residue or destruction by extensive stretching in the bond plane are known from, for example, U.S. Pat. No. 4,024,312 A, DE 33 31 016 C2, WO 92/11332 A1, WO 92/11333 A1, DE 42 22 849 C1, WO 95/06691 A1, DE 195 31 696 A1, DE 196 26 870 A1, DE 196 49 727 A1, DE 196 49 728 A1, DE 196 49 729 A1, DE 197 08 364 A1, DE 197 20 145 A1, DE 198 20 858 A1, WO 99/37729 A1 and DE 100 03 318 A1, and are also referred to below as strippable self-adhesive tapes.

Preferred fields of use of aforementioned strippable adhesive-sheet strips include more particularly the residuelessly and non-destructively redetachable fixing of light to moderately heavy articles in the home, workplace and office segments. In these applications they replace conventional fastening means, such as drawing pins, roundhead needles, thumb tacks, nails, screws, known self-adhesive tapes and liquid adhesives, for example. Key to the successful use of the abovementioned adhesive-sheet strips is not only the possibility of residueless and non-destructive redetachment of bonded articles but also their quick and easy bonding and the secure hold they provide for the envisaged period of bonding. It should be borne in mind in particular here that the adhesive strips must possess functional capacity on a multiplicity of substrates in order to be able to act as a universal fixing in the home, workplace and office segments.

In addition there are a large number of adhesive strips detachable by peeling on the market. In contrast to the aforementioned strippable adhesive strips, which possess a high holding power in order to be able to bond even moderately heavy articles, the bond strength of the adhesive strips detachable by peeling is substantially lower. One reason this must not be too high is so that the adhesive strips are redetachable even from sensitive substrates such as paper or wallpaper without damage to the substrate.

Another important factor for all redetachable adhesive strips, in addition to the easy and non-destructive detachability, is that absorbent substrates such as paper and wallpapers should not become grease-stained. For many sticky pads in the market, it is precisely this grease-staining which is one of the principal problems, since, in order to obtain soft detachment, frequently large amounts of plasticizers are added.

Given that there are now a large number of strippable and peelable adhesive strips on the market, and the person who bonds the strip is not necessarily the same as the person wishing to redetach the adhesive strip, it is not immediately apparent to the person performing detachment whether he or she should peel or pull in the bond direction in order to allow detachment. In the event of incorrect application, in the best-case scenario, nothing happens: the adhesive strip does not part. Frequently, however, there are instances of damage to at least one of the adherents, particularly in the case of adhesive bonds of lightweight articles, which are splitable.

Although the literature cited above describes a broad range of pressure-sensitive adhesives (PSAs) for use in strippable self-adhesive tapes, commercial products presently on the market (for example Tesa® Powerstrips® from tesa AG, 3M Command® adhesive strips from 3M, and Plastofix® Formuli Force 1000 strips from Plasto S.A.) primarily contain PSAs based on styrene block copolymers.

Typically use is made of linear or radial block copolymers based on polystyrene blocks and polybutadiene blocks and/or polyisoprene blocks: in other words, for example, radial styrene-butadiene $(SB)_n$ and/or linear styrene-butadiene-styrene (SBS) and/or linear styrene-isoprene-styrene (SIS) block copolymers. Advantages of the aforementioned styrene block copolymer-based PSAs for use in strippable self-adhesive tapes are, for example, the very high bond strengths which can be achieved with them (as a result, among other factors, of the simultaneous realization of a very high cohesion and very high adhesive forces), a pronounced reduction in tack on stretch detachment (which significantly facilitates, if not indeed allowing, the operation of detachment) and also a very high tensile strength, which more particularly is essential for a tear-free detachment operation.

For the use of the adhesives in peelable pressure-sensitive adhesive strips, however, the adhesive strength obtained with above products is much too high. When an adhesive strip of such strong adhesion is peeled in the case of splitable adherents, there are inevitably instances of destruction of the substrates.

Typically there are two ways of reducing the adhesive force: on the one hand, the fraction of the elastomer in the adhesive is increased; on the other hand, plasticizers are used, which lower the bond strength. Since the increased viscosity in the melt of the adhesives with high elastomer contents makes them much more difficult to process than is the case with adhesives having high plasticizer contents, preference is given to adhesives with high plasticizer contents. Moreover, adhesives with a high elastomer content are decidedly hard and possess a low tack, which renders them unattractive. On the other hand, however, high levels of plasticizers mean that the adhesive strips tend towards grease-staining, which, following application and detachment of the adhesive strips, leads to unsightly spots, particularly on wallpapers.

In order, finally, for an adhesive strip to be useful inconspicuously and as far as possible universally, it is preferably transparent, so that it can be used on windows and so that it does not show through papers that are to be bonded.

It is an object of the present invention to provide an adhesive for an adhesive-sheet strip which is suitable for bonding lightweight articles, which is redetachable both by peeling and by pulling substantially in the bond plane, and which, moreover, does not cause grease-staining of the substrate.

This object is achieved by means of a pressure-sensitive adhesive as described hereinbelow.

The invention accordingly provides a pressure-sensitive adhesive for single- or double-sidedly tacky pressure-sensitive adhesive strips redetachable without residue or destruction both by extensive stretching substantially in the bond plane and by peeling, the pressure-sensitive adhesive being composed at least of
  a vinylaromatic block copolymer,
  a solid tackifying resin having a softening temperature by the ring-and-ball method of more than 30° C. and
  a resin which is liquid at room temperature (23° C.),
the fraction of liquid resin accounting for at least 40% by weight, based on the total amount of resin.

Employed for the pressure-sensitive adhesives (PSAs) are block copolymers comprising polymer blocks which contain vinylaromatics (A blocks) such as styrene, for example, and which are formed by polymerization of 1,3-dienes (B blocks) such as, for example, butadiene and isoprene or a copolymer of both. It is also possible for blends of different block copolymers to be employed. Preference is given to block copolymers which are partly or fully hydrogenated.

Block copolymers may have a linear A-B-A structure. It is likewise possible to employ block copolymers of radial design, and also star-shaped and linear multiblock copolymers.

As a further component it is possible to use A-B diblock copolymers.

Instead of the polystyrene blocks it is also possible to utilize polymer blocks based on other aromatic-containing homopolymers and copolymers (preferably $C_8$ to $C_{12}$ aromatics) having glass transition temperatures of greater than 75° C., such as, for example, aromatic blocks containing α-methylstyrene. Likewise possible for utilization are polymer blocks based on (meth)acrylate homopolymers and (meth)acrylate copolymers having glass transition temperatures of greater than 75° C. In this case it is possible to employ not only block copolymers whose hard blocks are exclusively those based on (meth)acrylate polymers, but also those which utilize not only polyaromatic blocks, polystyrene blocks for example, but also poly(meth)acrylate blocks.

Instead of styrene-butadiene block copolymers and styrene-isoprene block copolymers and their hydrogenation products, i.e. styrene-ethylene/butylene block copolymers and styrene-ethylene/propylene block copolymers, it is likewise possible in accordance with the invention to use block copolymers and their hydrogenation products that utilize further polydiene-containing elastomer blocks, such as, for example, copolymers of two or more different 1,3-dienes. Further suitable for utilization in accordance with the invention are functionalized block copolymers such as, for example, maleic anhydride-modified or silane-modified vinylaromatic block copolymers.

Typical use concentrations for the block copolymer in the pressure-sensitive adhesive are situated within a concentration range between 30% and 70% by weight, preferably between 45% and 65% by weight, more preferably between 30% and 55% by weight. The other ingredients in the pressure-sensitive adhesive are composed of the resins and also of any additives present.

Tackifiers used are tackifier resins which are compatible with the elastomer block of the styrene block copolymers. Suitable tackifier resins include, preferably, non-hydrogenated, partially hydrogenated or fully hydrogenated resins based on rosin or rosin derivatives, hydrogenated polymers of dicyclopentadiene, non-hydrogenated, partially hydrogenated, selectively hydrogenated or fully hydrogenated hydrocarbon resins based on $C_5$, $C_5/C_9$ or $C_9$ monomer streams, polyterpene resins based on α-pinene and/or β-pinene and/or δ-limonene, and/or a hydrogenated polymer of pure $C_8$- or $C_9$ aromatics. Aforementioned tackifier resins can be used both alone and in a mixture, preferably at least partly hydrogenated resins.

The resins used are solid at room temperature and possess a softening point by the ring-and-ball method of more than 30° C.

If, in accordance with one preferred embodiment, the PSAs are to have a water-clearly transparent appearance, then it is preferred to use tackifier resins which do not exceed an intrinsic color of 2.0, measured in accordance with the Gardner color scale. Tackifier resins utilized in smaller amounts, in accordance with the concentration in which they are used, may also have inherent colors>Gardner 2.0.

According to DIN ISO 4630 (1982-11) the Gardner color number is a color number for the characterization of the color of clear liquids (for example binders for paints and coating materials). It is determined by visual comparison of the color of a sample in a glass tube with the color of defined color standards. The color of the sample that comes the closest to the particular color standard is designated as the Gardner color number. The reference standards used in the Gardner color scale are 18 glass color standards each with defined chromaticity coordinates and light transmittances.

Moreover, the adhesive formulation of the invention possesses at least one tackifier resin which is liquid at room temperature. This resin is present with a fraction of at least 40% by weight, preferably 50% by weight, based on the total resin fraction in the adhesive. The resins in question here are preferably likewise hydrogenated tackifier resins, although non-hydrogenated resins can also be used.

In principle it is possible to use the same resins as those already described above, with the proviso that they must be liquid at room temperature.

As further additives it is typically possible to utilize the following:
  primary antioxidants such as sterically hindered phenols, for example
  secondary antioxidants such as phosphites or thioethers, for example
  in-process stabilizers such as C-radical scavengers, for example
  light stabilizers such as UV absorbers or sterically hindered amines, for example
  processing assistants
  endblock reinforcer resins
  fillers such as, for example, silicon dioxide, glass (ground or in the form of beads), aluminium oxides, zinc oxides, calcium carbonates, titanium dioxides, carbon blacks, etc., and also color pigments and dyes, and also optical brighteners
  if desired, further polymers, preferably elastomeric in nature; elastomers which can be utilized accordingly include those based on pure hydrocarbons, unsaturated polydienes for example, such as natural or synthetically produced polyisoprene or polybutadiene, substantially chemically saturated elastomers such as, for example, saturated ethylene-propylene copolymers, α-olefin copolymers, polyisobutylene, butyl rubber, ethylene-propylene rubber, and also chemically functionalized hydrocarbons such as, for example, halogen-containing, acrylate-containing or vinyl ether-containing polyolefins, to name but a few.

Plasticizing agents which are not liquid resins, such as, for example, plasticizer oils or low molecular mass liquid polymers such as, for example, low molecular mass butadienes with molar masses <1500 g/mol (number average), are used only in very small amounts; preferably they are not used at all. Preference is therefore given to pressure-sensitive adhesives which are free of plasticizing agents.

PSAs of the invention can be used not only for single-layer but also for multi-layer pressure-sensitive adhesive strips redetachable without residue or destruction both by extensive stretching substantially in the bond plane and by peeling. Constructions with a further extensible carrier in the middle of the adhesive strips are also conceivable, in which case the extensibility of the carrier must be sufficient in order to ensure detachment of the adhesive strip by extensive stretching. As carriers it is possible, for example, to use highly extensible films or foams. Where they are used in multi-layer pressure-sensitive adhesive strips, PSAs of the invention may form the middle, inner layer and the outer layers of the adhesive strips. Where adhesives of the invention are used as outer layers, internal layers may selectively be constructed from adhesives based on styrene block copolymers saturated in the elastomer block and also from adhesives based on styrene block copolymers which are unsaturated in the elastomer block. In the latter case the outlying PSA layers typically contain UV stabilizers, UV absorbers for example, which reduce the UV exposure of the internal layers.

Single-sidedly tacky pressure-sensitive adhesive strips may be obtained in this case, for example, by neutralizing one side of the pressure-sensitive adhesive strip.

Typical converted forms of pressure-sensitive adhesive strips utilizing the PSAs of the invention are adhesive-tape rolls and also strips, of the kind obtained, for example, in the form of diecuts. The diecuts optionally include a non-tacky finger-tab region from which the detachment operation can be performed.

The diecuts advantageously have an area of 0.5 to 20 cm$^2$, preferably of 0.7 to 5 cm$^2$.

The thickness of the diecuts is dependent on their construction. Where the diecut consists of one layer, this solely of the PSA, diecut thicknesses of between 200 to 1500 µm, preferably 300 to 1000 µm, are advantageous. If the diecut consists of an extensible carrier, such as a foam or a film, for example, on each side of which a layer of the PSA has been applied, then in one preferred embodiment the PSA layers have thicknesses of 20 to 300 µm, preferably 50 to 200 µm. The thicknesses of the foam materials used are situated more particularly between 150 µm and 600 µm, preferably between 250 µm and 550 µm, but may also be up to 1000 µm. If films are used, their thicknesses are preferably between 20 to 180 µm, more preferably 50 to 150 µm. All of the stated thicknesses are to be understood as exemplary and are not intended to restrict the invention in any way.

In order that the strippable adhesive-sheet strips of the invention can be redetached easily and without residue they have to possess certain technical properties. On stretching, the tack of the adhesive-sheet strips must drop significantly. The lower the bonding performance in the stretched condition, the less the extent to which the substrate is damaged on detachment.

Moreover, in order to be able to be redetached easily without residue, strippable adhesive tapes have to possess not only the technical properties described above but also certain mechanical properties. The ratio of the tearing force to the stripping force must be greater than two, preferably greater than three. This stripping force is the force that has to be exerted in order to remove an adhesive strip from a bond line by parallel pulling in the direction of the bond plane. This stripping force is the sum of the force needed to detach the adhesive tape from the bond substrates and the force that must be exerted in order to deform the adhesive tape. The force required to deform the adhesive tape is dependent on its thickness. In contrast, within the range under consideration, the force needed for detachment is independent of the thickness of the adhesive strips.

In further contrast, the tear resistance rises proportionally with the thickness of the adhesive strips. It follows from this that, for self-adhesive tapes with a single-layer construction, of the kind that are disclosed in DE 33 31 016 C2, there is a certain thickness beneath which the tear resistance becomes smaller than the removal force. Above a certain thickness, in contrast, the ratio of removal force to stripping force becomes greater than two. If, however, the tearing force of the polymers used is very low, it follows that the thickness must be very great, as a result of which the stripping forces rise as well.

Surprisingly, in spite of the high level of liquid tackifier resin, the adhesive strips described have a tearing force which is sufficiently high to ensure detachment by pulling in the bond plane in the case of lightweight flexible articles, without tears occurring, particularly when, in the case of a single-layer construction, the thickness is more than 200 µm.

It has been found, surprisingly, that when liquid resins are used as plasticizers, in contrast to the use of plasticizer oils, which are typically preferred, there is no grease-staining if styrene block copolymers are used as elastomers.

The PSAs can be prepared and processed from solution, from dispersion, and from the melt. Preferred processes of preparation and processing are from solution and from the melt. Particular preference is given to the manufacture of the adhesive from the melt—in which case it is possible more particularly to use batch processes or continuous processes. The continuous manufacture of the PSAs by means of an extruder is especially advantageous.

Examples and the figures described below are used to illustrate particularly advantageous versions of the invention, without any intention of thereby unnecessarily restricting the invention.

BRIEF DESCRIPTION OF THE DRAWINGS

In the figures:

FIG. 1 shows the tacky adhesive strip 10 of the invention in which the core layer 1 is composed of the adhesive of the invention redetachable by extensive stretching more particularly in the bond plane. The core layer 1 has a region which serves as a finger tab, and which is pulled in order to obtain the extensive stretching more particularly in the bond plane of the core layer 1. This region is treated on both sides so as not to be tacky, by the application of, preferably, siliconized film or paper pieces 6. The adhesive strip 10 preferably has no finger tab formed by lining.

FIG. 2 shows the tacky adhesive strip 10 of the invention in which the core layer 1 is composed of a carrier redetachable by extensive stretching more particularly in the bond plane. Applied on the carrier 1 are two adhesive layers 2, 3, which preferably have the same composition.

Test Methods

Figure 1:
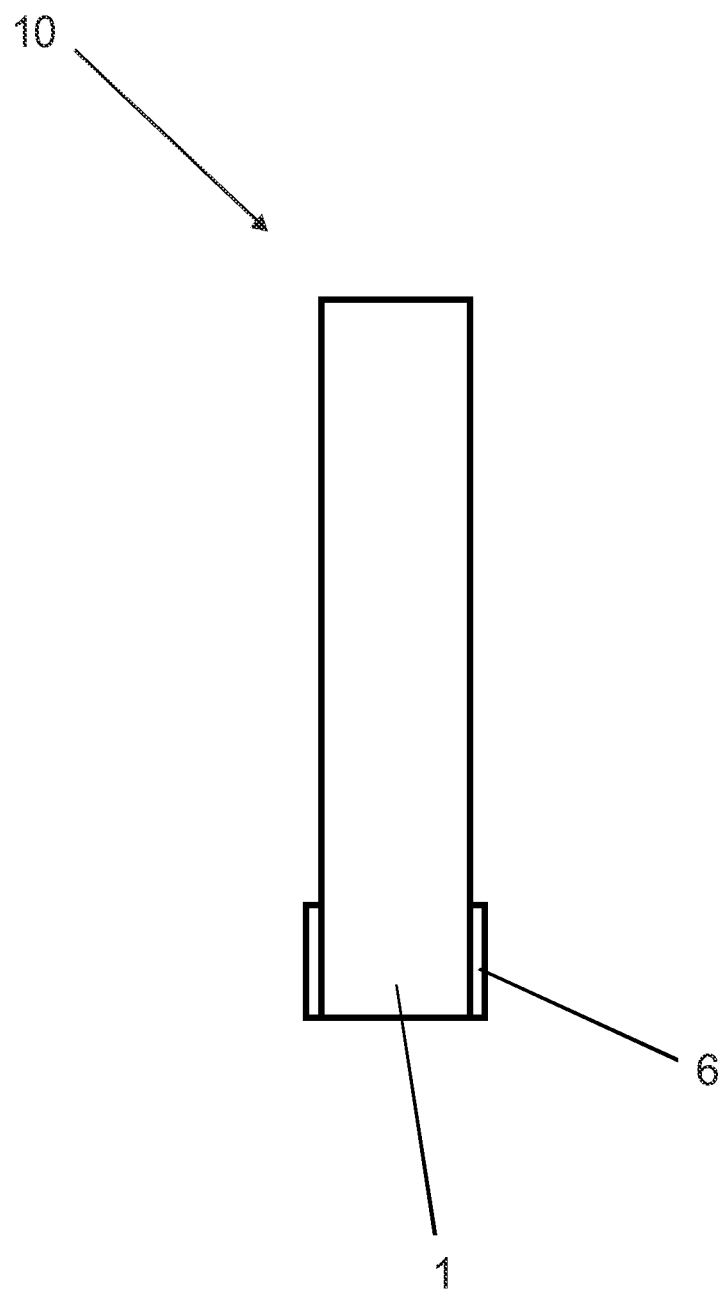
FIG. 1 shows the tacky adhesive strip of the invention in which the core layer is composed of an adhesive.
Figure 2:
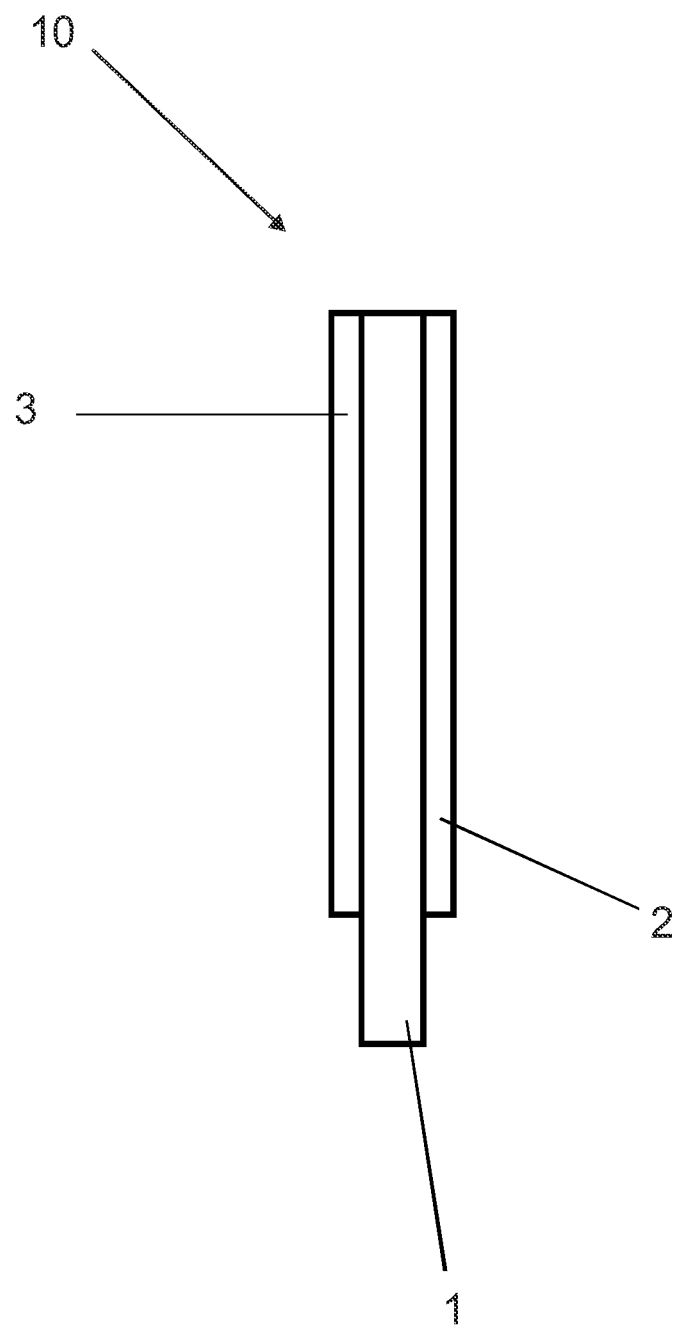
FIG. 2 shows the tacky adhesive strip of the invention in which the core layer is composed of a carrier.

The measurements of the tensile strength and of the maximum extension are made, unless noted otherwise, by methods based on DIN 53504, using S3-sized dumb bells and a separation speed of 300 mm/min.

For the determination of the detachment force (stripping force) an adhesive sheet measuring 50 mm×20 mm (length× width), which at its upper end has a non-tacky finger-tab region, is bonded between two plies of 80 g paper (arranged congruently with one another) measuring 50 mm×30 mm, with an applied pressure of 100 N, in such a way that the finger-tab region protrudes from the bond line. The bonds are stored at +40° C. for 24 h. Following reconditioning to room temperature, the ends of the paper without adhesive are fixed for the purpose of measurement in the lower jaw of a tensile testing machine. For the measurement, the adhesive-sheet strip is extracted with a pulling speed of 1000 mm/min parallel to the bond plane. In the course of this procedure the required detachment force is measured, in N. The figure reported is the average value of the stripping stress values (in N/cm) measured in the region within which the adhesive strip has undergone detachment from the papers over a bonding length of between 10 mm and 40 mm.

For the measurement of the holding power, pieces of adhesive measuring 1 cm² are bonded to Erfurt 52 grade woodchip wallpaper. Adhered to the other side are three clipped-together pieces of DIN A4 paper with a basis weight of 80 g/m². A measurement is made of the time, in days, after which the papers fall from the woodchip wallpaper.

For the grease-staining measurement, three adhesive strips measuring 1 cm² are adhered to a piece of copying paper and stored in a forced-air drying cabinet at 40° C. for 3 months. Subsequently the adhesive strips are removed and the paper is examined for traces of grease-staining.

Three adhesive strips measuring 1 cm² are bonded between woodchip wallpaper and paper, as described for the holding power, and stored at room temperature for 1 month. Subsequently the paper is peeled off at a moderate speed, and both the wallpaper and the paper are examined for instances of damage. In addition, three specimens prepared in exactly the same way are parted again by carefully pulling on one corner of the adhesive strip, parallel to the bond plane, and in this way the entire adhesive strip is removed from the bond line. Examination is made to determine whether the two adherents have been damaged and whether the adhesive tears.

The ring-and-ball method is the customary method of ascertaining the softening points. Details can be found in ASTM E 28 and DIN EN 1238, which are hereby expressly incorporated by reference.

Production of Pressure-Sensitive Adhesive Strips

The PSAs were processed to a homogeneous mixture in a heatable kneading apparatus with a sigma blade (Werner and Pfleiderer LUK 1,0 K3, equipped with an LTH 303 thermostat from mgw LAUDA) at a temperature of approximately +140 to +160° C. under $CO_2$ inert-gas inertization. After the mixture had cooled, single-layer adhesive sheet pieces were produced by pressing the adhesive in a heatable press (type KHL 50 from Bucher-Guyer) at +100° C. to +120° C. for approximately 5 minutes. The thickness of the sheets was 700 µm±50 µm.

EXAMPLES

The invention is illustrated below by a number of examples, without wishing thereby to restrict the invention.

Added to all of the examples were 0.5 part of Irganox 1010, a sterically hindered phenol (CAS 6683-19-8), as an ageing inhibitor, and 0.5 part of Tinuvin P (2-(2'-hydroxy-5'-methylphenyl)benzotriazole), as a UV absorber.

Example 1

| 80 parts | Septon 2063 | SEPS with 13% block polystyrene content and approximately 60% diblock content, from Kuraray |
| 20 parts | Septon 2007 | SEPS with 30% block polystyrene content and with no diblock, from Kuraray |
| 60 parts | Escorez 5600 | Hydrogenated HC resin with a softening point of 100° C., from Exxon |
| 70 parts | Escorez 5040 | Hydrogenated liquid HC resin from Exxon |

Example 2

| 70 parts | Kraton G 1657 | SEBS with 13% block polystyrene content and approximately 36% diblock content, from Kraton |
| 30 parts | Kraton G 1650 | SEBS with 30% block polystyrene content and with no diblock, from Kraton |
| 65 parts | Regalite S 1100 | Partly hydrogenated HC resin with a softening point of 100° C., from Eastman |
| 85 parts | Regalite R 1010 | Hydrogenated liquid HC resin from Eastman |

Comparative Example C3

| 70 parts | Kraton G 1657 | SEBS with 13% block polystyrene content and approximately 36% diblock content, from Kraton |
| 30 parts | Kraton G 1650 | SEBS with 30% block polystyrene content and with no diblock, from Kraton |
| 120 parts | Regalite S 1100 | Partly hydrogenated HC resin with a softening point of 100° C., from Eastman |
| 20 parts | Regalite R 1010 | Hydrogenated liquid HC resin from Eastman |

Comparative Example C4

| 70 parts | Kraton G 1657 | SEBS with 13% block polystyrene content and approximately 36% diblock content, from Kraton |
| 30 parts | Kraton G 1650 | SEBS with 30% block polystyrene content and with no diblock, from Kraton |
| 65 parts | Regalite S 1100 | Partly hydrogenated HC resin with a softening point of 100° C., from Eastman |
| 85 parts | Ondina G41 | Aliphatic-rich medical white oil from Shell |

The adhesives described above were used to produce single-layer adhesive strips 700 µm thick, with the following properties:

| PSA of Example No. | Tensile strength in N/cm | Stripping force in N/cm | Holding power in days | Grease-staining | Redetachability by peeling | Redetachability by pulling |
| --- | --- | --- | --- | --- | --- | --- |
| 1 | 42.3 | 9.2 | >20 | none | without damage | without tears or damage |

-continued

| PSA of Example No. | Tensile strength in N/cm | Stripping force in N/cm | Holding power in days | Grease-staining | Redetachability by peeling | Redetachability by pulling |
|---|---|---|---|---|---|---|
| 2 | 45.7 | 10.4 | >20 | none | without damage | without tears or damage |
| C3 | 49.4 | 12.3 | >20 | none | tears to both wallpaper and paper | without tears or damage |
| C4 | 43.8 | 9.8 | 12 | very severe | without damage | without damage, tore once |

What is claimed is:

1. A method of forming and releasing an adhesive bond, said method comprising adhering a pressure-sensitive adhesive strip to a sensitive substrate to form an adhesive bond, the sensitive substrate being susceptible to tearing, and the sensitive substrate being selected from the group consisting of paper and wallpaper, and thereafter releasing the adhesive bond by peeling the adhesive strip from the substrate, wherein the adhesive strip comprises a pressure-sensitive adhesive composed at least of:
   a vinylaromatic block copolymer,
   a solid tackifying resin having a softening temperature by the ring-and-ball method of more than 30° C. and
   a resin which is liquid at room temperature (23° C.),
   the fraction of liquid resin accounting for at least 40% by weight, based on the total amount of resin.

2. Method according to claim 1, wherein the vinylaromatic block copolymer is a styrene block copolymer.

3. Method according to claim 1, wherein the vinylaromatic block copolymer is composed of styrene as A block and, as B blocks, of butadiene and/or isoprene and/or their hydrogenation products or of isobutylene.

4. Method according to claim 1, wherein the block copolymer is at least partly hydrogenated.

5. Method according to claim 1, wherein the solid tackifying resin is selected from the group consisting of non-hydrogenated, partially hydrogenated or fully hydrogenated resins based on rosin or on rosin derivatives, hydrogenated polymers of dicyclopentadiene, non-hydrogenated, partially hydrogenated, selectively hydrogenated or fully hydrogenated hydrocarbon resins based on $C_5$, $C_5/C_9$ or $C_9$ monomer streams, polyterpene resins based on α-pinene and/or β-pinene and/or δ-limonene, and/or a hydrogenated polymer of pure $C_8$- or $C_9$ aromatics.

6. Method according to claim 1, wherein the pressure-sensitive adhesive is transparent.

7. Method according to claim 1, wherein the pressure-sensitive adhesive strip has an extensible carrier and a layer of the pressure-sensitive adhesive applied on at least one side of said carrier.

* * * * *